United States Patent [19]
Yunick

[11] Patent Number: 4,503,833
[45] Date of Patent: Mar. 12, 1985

[54] APPARATUS AND OPERATING METHOD FOR AN INTERNAL COMBUSTION ENGINE

[75] Inventor: Henry Yunick, Daytona Beach, Fla.

[73] Assignee: MotorTech, Inc., Daytona Beach, Fla.

[21] Appl. No.: 622,409

[22] Filed: Jun. 22, 1984

Related U.S. Application Data

[63] Continuation of Ser. No. 312,495, Oct. 19, 1981, abandoned.

[51] Int. Cl.$^3$ ............................................. F02M 31/00
[52] U.S. Cl. .................................. 125/545; 123/592; 261/144; 48/189
[58] Field of Search ............... 48/189.2, 189.4, 189.5; 123/545, 592, 547, 544, 590, 540; 261/144, 145; 60/599

[56] References Cited

U.S. PATENT DOCUMENTS

| | | | |
|---|---|---|---|
| 1,153,077 | 9/1915 | Hippel | 123/592 |
| 1,335,665 | 3/1920 | Deppel | 123/592 |
| 1,583,584 | 5/1926 | Donning | 123/545 |
| 2,133,775 | 10/1938 | Wiesmeier | 123/545 |
| 2,205,750 | 6/1940 | Ross | 123/592 |
| 2,216,722 | 10/1940 | Denson | 123/592 |
| 2,635,597 | 4/1953 | Boyce | 123/540 |
| 3,142,957 | 8/1964 | Roesling | 60/599 |
| 3,232,044 | 2/1966 | Gratsmuller | 60/599 |
| 3,595,013 | 7/1971 | Bulle | 60/599 |
| 4,036,188 | 7/1977 | Sami | 123/540 |

FOREIGN PATENT DOCUMENTS

| | | | |
|---|---|---|---|
| 1110524 | 2/1956 | France | 123/545 |
| 315628 | 3/1934 | Italy | 123/545 |
| 2055963 | 3/1981 | United Kingdom | 60/599 |

*Primary Examiner*—Ronald H. Lazarus
*Attorney, Agent, or Firm*—Watts, Hoffmann, Fisher & Heinke

[57] ABSTRACT

A method and apparatus for operating an electric ignition, internal combustion engine that substantially improves the fuel efficiency by utilizing heat normally discharged to the ambient to condition and prepare the fuel mixture prior to entry into the combustion chambers. The apparatus comprises a fuel vaporizer that transfers heat from the engine coolant system to the fuel mixture as it leaves a fuel introducing device such as a carburetor; a fuel mixture heater for heating the mixture above the vaporization temperature of the liquid fuel; and, a mixture homogenizer for thoroughly stirring the fuel mixture that is located in the fuel mixture flow path intermediate the vaporizer and heater. The homogenizer is operative to compress the fuel mixture under certain engine operating conditions and the heater forms the intake manifold for the engine and includes branch flow paths and associated conduits that communicate directly with each combustion chamber through a valve controlled port. The fuel mixture flow path from the homogenizer is constructed to minimize energy losses to the ambient.

31 Claims, 13 Drawing Figures

APPARATUS AND OPERATING METHOD FOR AN INTERNAL COMBUSTION ENGINE

This application is a continuation of application Ser. No. 312,495, filed Oct. 19, 1981, abandoned.

DESCRIPTION

1. Technical Field

The present invention relates generally to electric ignition, internal combustion engines each of which functions as an expander during a portion of a cycle and in particular to a new and improved fuel system and engine operating method.

2. Background Art

In conventional gasoline engines, particularly those used in the automotive industry, a carburetor mounted atop an intake manifold forms the principal component of a fuel system. As is well known, combustion air is drawn through the carburetor. A controlled amount of gasoline is added to the incoming air to form a combustible fuel/air mixture, as the air passes through a venturi throat formed in the carburetor. The intake manifold, which includes passages that communicate with valve controlled intake ports in the cylinder head of the engine, conveys and distributes the fuel/air mixture from the carburetor to the combustion chambers.

In theory, the liquid gasoline is vaporized prior to entering the combustion chambers. In practice, however, a major portion of the gasoline remains unvaporized and in a liquid state even as it enters the combustion chamber, finally vaporizing during the combustion process. The presence of unvaporized fuel in the combustion chamber, reduces the heat of combustion, thus limiting the power output of the engine.

It has long been recognized that the efficiency of the gasoline engine is substantially less than ideal. One factor contributing to poor efficiency in some engines is known as carburetor "double pull". Since the intake port is usually opened well before the exhaust stroke is completed, gases are forced in a reverse direction through the carburetor venturi drawing fuel into this flow. This reverse flow goes into the air inlet and filter wasting fuel. Another factor is a substantial portion of the energy available in each pound of gasoline consumed by an engine, is discharged to the ambient as waste heat from its cooling and exhaust systems and by way of radiation from the engine. Automotive designers over the years have proposed methods and apparatus for recapturing and utilizing at least a portion of this waste heat.

One proposed apparatus is an exhaust driven supercharger, more commonly called a turbocharger. A turbocharger generally comprises a pair of turbines mounted to a common shaft. One turbine is a drive turbine disposed in an exhaust flow path, while the other turbine is a compressor turbine disposed, at least in some instances, in the intake flow path between the carburetor and the combustion chambers. In this configuration, the exhaust gases discharged by the combustion chambers expand across the exhaust turbine to rotate it and the intake turbine thereby compressing gases in the fuel air mixture. This compression permits an increase in the amount of fuel introduced into each piston cylinder during the intake stroke of its piston while maintaining a desired fuel/air ratio, to produce an attendant increase in the engine's power output.

The addition of a turbocharger has not increased engine fuel efficiency in normal automotive usage. In general, the turbocharger allows a smaller engine with less friction to be used in a given size vehicle.

With these prior engines under operating conditions where cylinder intake produces high vacuum, pressure from the ambient air on the intake side of the turbocharger may exceed manifold pressure thus creating a pressure differential across the compressor side of the turbocharger. When an engine is idling there is little exhaust flow to drive the turbine and high vacuum manifold conditions exist so there is a large pressure differential across the compressor side of the turbocharger. This pressure differetial causes an air flow through the compressor side. This air flow applies rotational forces to the compressor blade in opposition to the drive turbine.

Because exhaust flow is low, the air flow produced forces may be sufficient to cause reverse rotation of the compressor and will in any event prevent effective turbocharger operation. Thus, under light load the turbocharger is essentially inoperative and in fact may run backwards.

Another problem with each prior engine with a turbocharger between its carburetor and its intake manifold occurs on acceleration. When the throttle opening is increased, the quantity of liquid fuel droplets contained in the fuel/air mixture is increased virtually instantaneously but exhaust flow is not. This additional liquid fuel causes a significant increase in the load on the compressor turbine. Indeed in test racing engines the load increases on occasion, have been great enough to cause compressor turbine destruction. Since the driving force from exhaust gases is substantially constant the compressor is slowed by this load increase and the compressing action of the turbocharger is reduced. In time the increased fuel produces increased exhaust gases, causing the turbocharger to increase its speed and output. In sum, prior turbocharged engines have slow response to demands for power increases and will consume excessive fuel for a time whenever there is a significant increase in throttle opening. In fact, this excessive fuel consumption has made it difficult, if not impossible, for prior turbocharged engines to meet Environmental Protection Agency (EPA) standards if the turbocharger in fact operates during testing.

Other proposals for increasing the fuel efficiency of gasoline engines have included methods and apparatus for heating the fuel to aid vaporization. Prior proposals have suggested heating the fuel-air mixture by transferring heat from either the engine cooling system or the engine exhaust system. Problems associated with heating a fuel/air mixture as it travels to a combustion chamber, have long been recognized.

These problems include an increase in the temperature of the fuel mixture decreases the mixture density and causes a decrease in the volumetric efficiency of the engine for its decreases the amount of fuel drawn into each cylinder during an intake stroke. In addition, heating the fuel often causes a vapor lock condition in the fuel system which partially or completely blocks the flow of fuel into the intake flow path, degrading engine performance. To avid vapor lock, many of the proposed fuel mixture heaters operate during engine warmup only and are turned off once the engine reaches its operating temperature. Further, prior hot vapor engine proposals have utilized storage chambers from which the fuel air mixture is modulated. Such a chamber is large and can be dangerous.

With prior engines, during engine warmup, vaporized fuel condensed on the interior walls of the intake manifold and other surfaces. Manifold and carburetor heating systems have been proposed to operate during engine warmup and were intended to solve or minimize this problem. While such proposals might improve conditions during warmup, the fuel still experienced as many as four phase changes as it travelled from the carburetor to the combustion chambers, even in an engine that had reached its operating temperature. Specifically, portions of the fuel entrained in the mixture flow shift between vapor and liquid states as the mixture travels through the engine intake system. Moreover, these phase change characteristics in a multi-cylinder engine are uneven varying from cylinder to cylinder and further varying with engine speed and load.

These phase changes contribute to the reduction in thermal efficiency in an engine due to: (1) the induction of some liquid fuel into the combustion chambers; (2) the nonuniform nature of the fuel-air mixture; and, (3) substantial heat energy losses to the intake manifold and other components of the fuel system. These losses are substantial because gasoline, like all liquids, has a relatively high heat of vaporization.

The prior proposals for increasing the thermal efficiency of an engine have not recognized or addressed this problem. In most of the proposed systems, the fuel or fuel mixture was merely to be heated by either fluid from the engine cooling system or alternately by exhaust gases.

Combining a turbocharger with a fuel mixture heating apparatus has been proposed in the past. In one such proposal, the fuel charge would be heated by exhaust gases during part throttle operating conditions only. During full throttle conditions, the exhaust gases would be diverted to a turbocharger and the fuel mixture would go unheated, so that its density would be maximized.

It has also been found that many engine designers are of the opinion that the fuel mixture should be cooled after leaving a turbocharger or a supercharger. A cooling device commonly called an "intercooler" is disposed between the outlet of the supercharger and the combustion chambers. The purpose of the intercooler is to remove the heat generated as the mixture is compressed so that the fuel mixture density is increased. These seemingly conflicting proposals would indicate that confusion and uncertainty still exist in fuel system design theory.

The measure of success, however, in increasing the fuel efficiency of an internal combustion engine does not reside in the complexity or simplicity of the apparatus or the rigid adherence to long taught engine design principals, but in the increase in gasoline mileage and engine performance actually achieved in a given size engine.

DISCLOSURE OF INVENTION

The present invention provides a new and improved apparatus and method for improving the fuel efficiency of an electric ignition, internal combustion engine. It is readily adaptable to existing automobile engines for it does not require excessive engine retooling and it will decrease the cost and weight of the vehicle.

According to the invention, a fuel charge forming apparatus is disclosed for combining a vaporizable fuel, such as gasoline, with combustion air in controlled proportions. The apparatus utilizes heat normally exhausted by the engine to condition the fuel mixture. The apparatus prepares and conditions the fuel/air mixture during its laminar flow travel to the engine combustion chambers to insure complete fuel vaporization and thorough fuel/air mixing so that maximum energy output is realized during the combustion process.

In the preferred embodiment, a fuel mixture flow path is defined that extends between a fuel mixture introducing device, such as a carburetor and the engine combustion chambers. The flow path communicates with each combustion chamber through an associated valve controlled port. The apparatus further comprises an air heater and fuel/air mixture vaporizing and heating devices disposed in the flow path, and a fuel mixture homogenizer located between the fuel mixture vaporizing and heating devices. While tests of the present invention have been conducted using a conventional carburetor, it is believed that the operation of the apparatus does not depend on the use of a carburetor; alternate methods for introducing fuel into an air flow path such as pressure carburetion and manifold injection are also contemplated.

In the preferred embodiment, the fuel mixture vaporizer includes a chamber disposed in the flow path intermediate the carburetor and the fuel mixture homogenizer that is heated by fluid from an engine cooling system. The heat absorbed by the engine cooling system, which in the past has been wasted, is transferred to the incoming fuel mixture as it passes through the vaporizer chamber thereby enhancing fuel vaporization and producing an at least partially vaporized mixture.

The mixture is then directed to the fuel mixture homogenizer which stirs and further heats the mixture so that the fuel is fully vaporized to a "supervaporized" state and the vapor is uniformly dispersed.

The preferred homogenizer is exhaust driven and includes a pair of turbines mounted on a common shaft and rotatably supported in a structure that defines separate turbine chambers. One turbine is an exhaust driven turbine and it, in turn, drives the other turbine which is an homogonizing turbine disposed in the fuel mixture flow path. The turbines are sized to provide both mixing and mixture pressurization at all throttle openings. Unlike the prior art turbochargers, the homogenizer functions throughout the engine operating range insuring thorough fuel vaporization and mixing and dispersion of the fuel uniformly throughout the air of the mixture. One major reason the homogenizer functions throughout the engines operating range is that the fuel/air mixture is temperature expanded across the homogenizing turbine applying rotational force additive to the exhaust gas produced forces.

In one version of the engine the heated homogenizer housing defines intake air flow passages which are connected to the carburetor air intake by a hot air conduit. Air is heated as it passes through these passages. A temperature responsive valve closes off an ambient air inlet to the carburetor whenever air supplied by the hot air conduit is below about 110° F. and manifold vacuum is above four inches.

An EGR system is provided in the version of the engine which has preheated air. Unlike prior EGR systems, the system of the present invention assures uniform distribution of recirculated exhaust and vaporization of residual hydrocarbons. This uniformity is accomplished by introducing the EGR fluids to the fuel- /air mixture flow path at or ahead of the entrance to the homogenizer. As these residuals are passed through the homogenizer they are thoroughly admixed with the fuel/air mixture assuring for the first time uniform distribution of the residuals among the combustion chambers.

Since the fuel/air mixture is preheated before it is introduced into the homogenizer its specific density is low and little, if any, unvaporized fuel is present. Thus the fuel air mixture is comparatively easy to compress and continuous compression of its output can and does occur at all engine speeds. In addition the outlet from the chamber is somewhat restricted to partially isolate the homogenizer's mixing chamber from pressure differentials between the input and output sides of the homogenizer which occur during power demand conditions and prevents a "double pull" on the fuel supply. This isolation coupled with the low specific density of the fuel/air mixture and the mixtures thermal expansion permit the homogenizer to function efficiently during acceleration. Thus, the homogenizer operates at idle conditions and response lag is not experienced during accelerating conditions.

The fuel mixture heater is disposed in the mixture flow path between the outlet of the homogenizer and the intake ports of the engine. In the preferred embodiment, the fuel mixture heater includes an exhaust heated chamber through which the mixture passes on its way to the combustion chamber. The heater insures that the fuel remains in its completely vaporized state, preferably at a temperature twice the vaporization temperature of the fuel, prior to entering the combustion chamber.

It is believed that automobile engines presently being manufactured can be modified or adapted to utilize the present invention and thereby realize a substantial gain in fuel efficiency. Some conventional components are eliminated and those components which are used do not require exotic materials, extensive engine retooling or complicated manufacturing processes. In addition, smaller engines can be standard equipment in present automobiles to decrease their cost and weight.

According to the exemplary and illustrated embodiment, the fuel mixture vaporizer comprises a housing that also serves as a mounting base for the carburetor. The housing defines an interior chamber that communicates with the throat of the carburetor and an outlet conduit that conveys the fuel mixture from the chamber to the homogenizer. Coolant passages, located in the walls of the housing, support coolant flow between an inlet and an outlet forming part of the vaporizer. Suitable conduits communicate the coolant inlet and outlet with the engine cooling system. A small radiator is coupled in parallel with the vaporizer. A thermostatically controlled valve blocks flow to the radiator whenever coolant temperature is below about 200° F.

The fuel mixture heater comprises a housing that includes passages in the side walls through which exhaust gases travel and heat the interior walls of the plenum. According to a feature of this embodiment, the chamber includes vertically standing ribs which subdivide the mixture flow into a plurality of branch flow paths, the number of which corresponds to the number of cylinders in the engine. Conduits direct exhaust gases from the combustion chambers to the passages formed in the walls of the plenum chamber.

The disclosed apparatus recaptures heat normally wasted from both the engine cooling system and the engine exhaust system and utilizes this heat to completely vaporize and thoroughly mix the fuel mixture. As a result, the size of the vehicle radiator can be significantly reduced and the need for a radiator fan is eliminated.

Normally, the coolant radiator is necessary to provide the means for discharging the waste heat absorbed by the engine coolant. In the present invention, the waste heat is transferred and absorbed by the vaporizing fuel. The heat absorbed by the fuel reduces the coolant temperature and thus supplants a significant part of the radiator function.

Additionally, the coolant system conduits and pump are sized so that the coolant flow rate through the engine is linear with engine output to provide the requisite amount of heat to the fuel mixture vaporizer.

According to another feature of the invention, an isolator is positioned between the carburetor and the fuel mixture homogenizer. The purpose of the isolator is to inhibit direct, uncontrolled heat conductivity along the mixture flow path to the base and thence to the bowl of the carburetor. The isolator minimizes the incidence of vapor lock that might occur in the carburetor when a "hot" engine is turned off. The isolator inhibits the transmission of engine heat to the bowl of the carburetor through the structure that defines the mixture flow path.

In a more specific embodiment, the isolator comprises an elastomeric, nonconductive coupling between the outlet of the engine preheater and the inlet to the homogenizer. In this preferred embodiment, the carburetor and vaporizer are mounted to the vehicle chassis or body and hence the isolator prevents not only the transmission of heat to the carburetor but engine vibration as well. It is believed the vibration isolation provided by this isolator construction and carburetor mounting increases the reliability of the carburetor, prevents loss of fuel flow control due to vibration, and should reduce the incidence of carburetor readjustment.

The present invention discloses a method for operating an engine in which all the fuel is fully vaporized before it is introduced into the combustion chamber and once vaporized remains vaporized as it is conducted through the engine intake system. The fuel is not only completely vaporized but is also thoroughly mixed so that a uniform fuel and air mixture enters the combustion chamber. According to the method, the fuel, such as gasoline, is entrained in a flow of atmospheric air. The entrained fuel and air, forming a somewhat non-homogenous fuel mixture is preheated by heat derived from the engine, i.e., from either the engine cooling or engine exhaust system. The fuel and atmospheric air is then mixed by a homogenizer to produce a uniform fuel/air mixture. The homogenous mixture is then further heated to a temperature well in excess of, preferably at least twice, the vaporization temperature of the fuel and then it is introduced, virtually immediately, into a combustion chamber.

In order to take full advantage of the fuel preparation apparatus and method disclosed above, the present invention also provides additional method steps for operating an engine to optimize the amount of energy extracted from the fuel charge inducted into the combustion chamber. This optimizes the power output of the engine and reduces the amount of heat which must be taken out with a cooling system thus contributing to the reduction in radiator size. According to these additional method steps, the volume of the combustion chamber is held substantially constant during the combustion process until the gases and products of the combustion reaction substantially reach their maximum temperature and pressure. In order to accomplish these method steps, the crankshaft stroke and piston rod length are selected so that the piston remains within 0.001 inches of top-dead-center (TDC) for at least 13° of crankshaft rotation.

It is believed that the disclosed fuel charge forming apparatus used in connection with the engine operating method disclosed by the present invention provides an engine that functions as an "expander", that is, an engine in which all useful expansion forces generated during combustion are utilized for producing motion in the piston and to a significant extent, are not dissipated as heat losses. Maintaining the piston virtually at TDC until, the combustion temperature and pressure are optimized assures that the heat energy generated is primarily dissipated in driving the piston downwardly, minimizing heat losses to the engine cooling and exhaust systems. Moreover, heat released to these engine systems is returned to the incoming fuel mixture via the fuel vaporizing and heating devices and the homogenizer. In essence, the present invention provides a "hot vapor cycle" engine in which balanced heat loops transfer heat from the engine to the fuel mixture flow path, the heat transferred being proportional to engine output.

The apparatus and method disclosed by the present invention has been found to substantially increase the fuel efficiency and power output of a gasoline automotive engine. Moreover, it was found that the low rpm torque was also increased while the tendency towards pre-ignition and detonation were decreased.

Additional features and a full understanding can be obtained in reading the following detailed description made in connection with the accompanying drawings.

BEST MODE FOR CARRYING OUT THE INVENTION

The present invention provides a new and improved apparatus and method for substantially improving the fuel efficiency of an electric ignition, internal combustion engine. In accordance with the invention, engine heat normally discharged to the ambient by the exhaust and coolant systems is captured and utilized to prepare and condition the incoming fuel mixture so that increased combustion efficiency is realized. In particular, the present invention thoroughly mixes and vaporizes the incoming fuel charge prior to entry into the engine combustion chambers.

Figure 1:
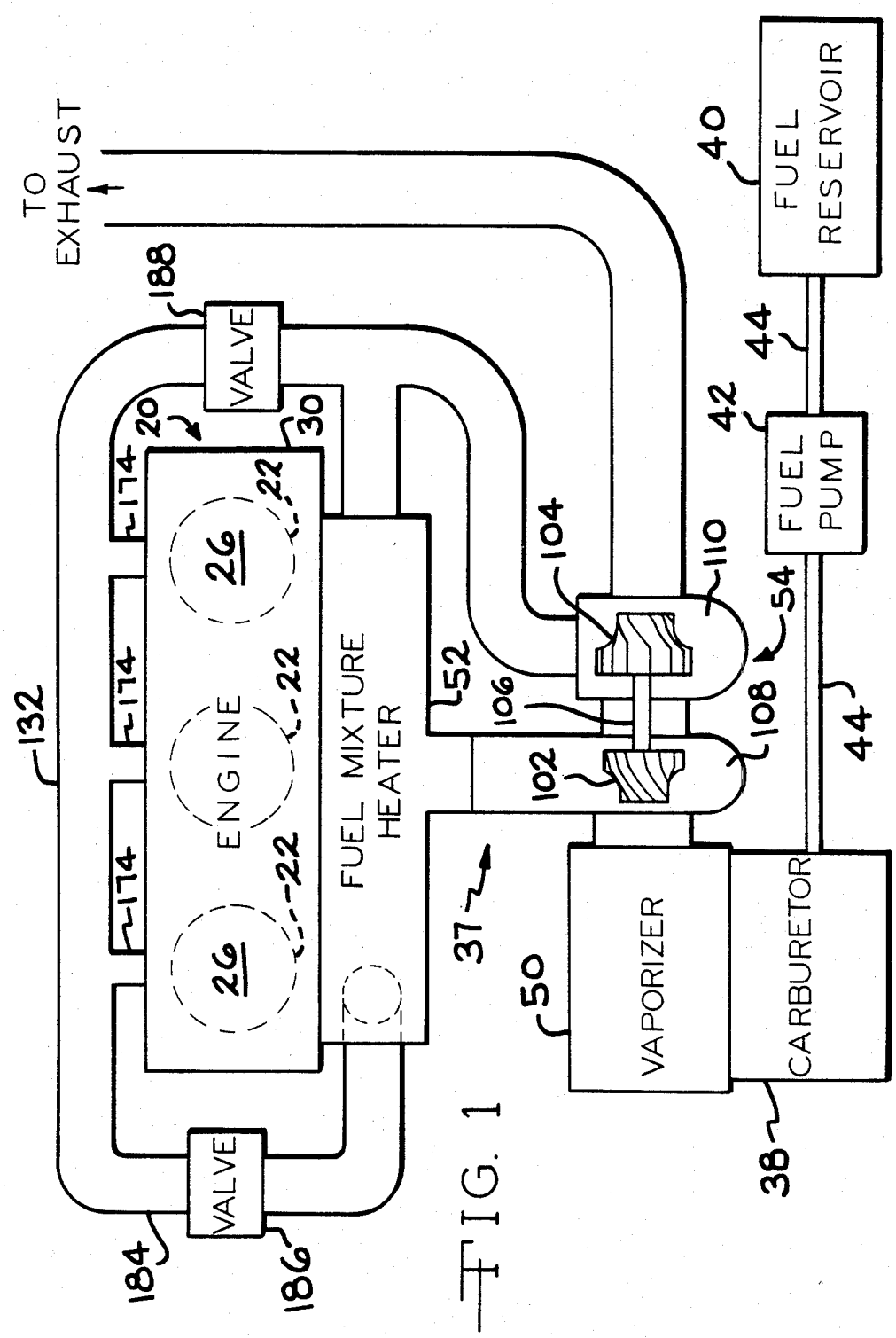
FIG. 1 is a schematic view of a fuel mixture preparing and conditioning apparatus constructed in accordance with the preferred embodiment of the invention.
Figure 3:
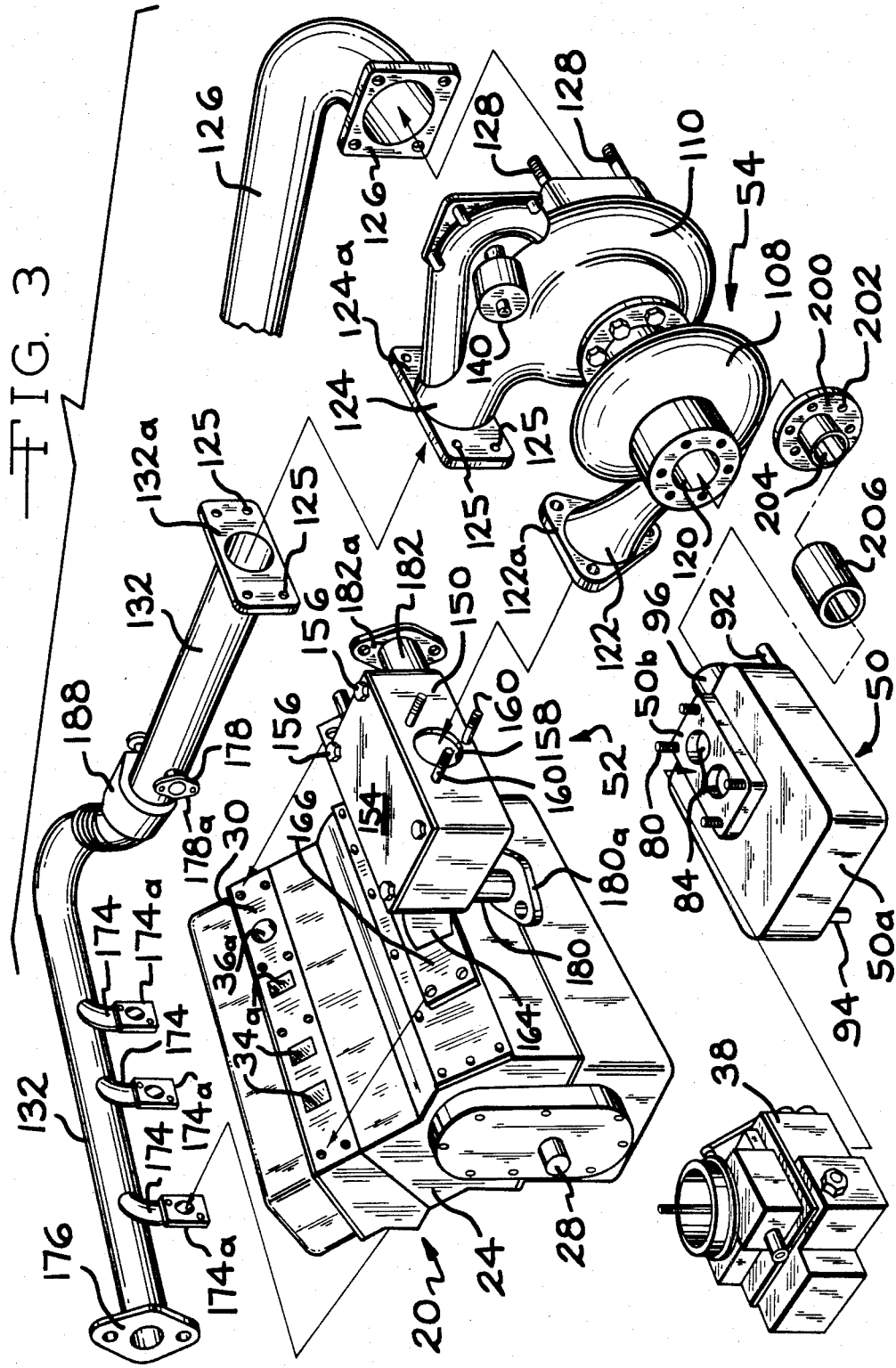
FIG. 3 is an exploded view of the fuel mixture preparing and conditioning apparatus.
Figure 4:
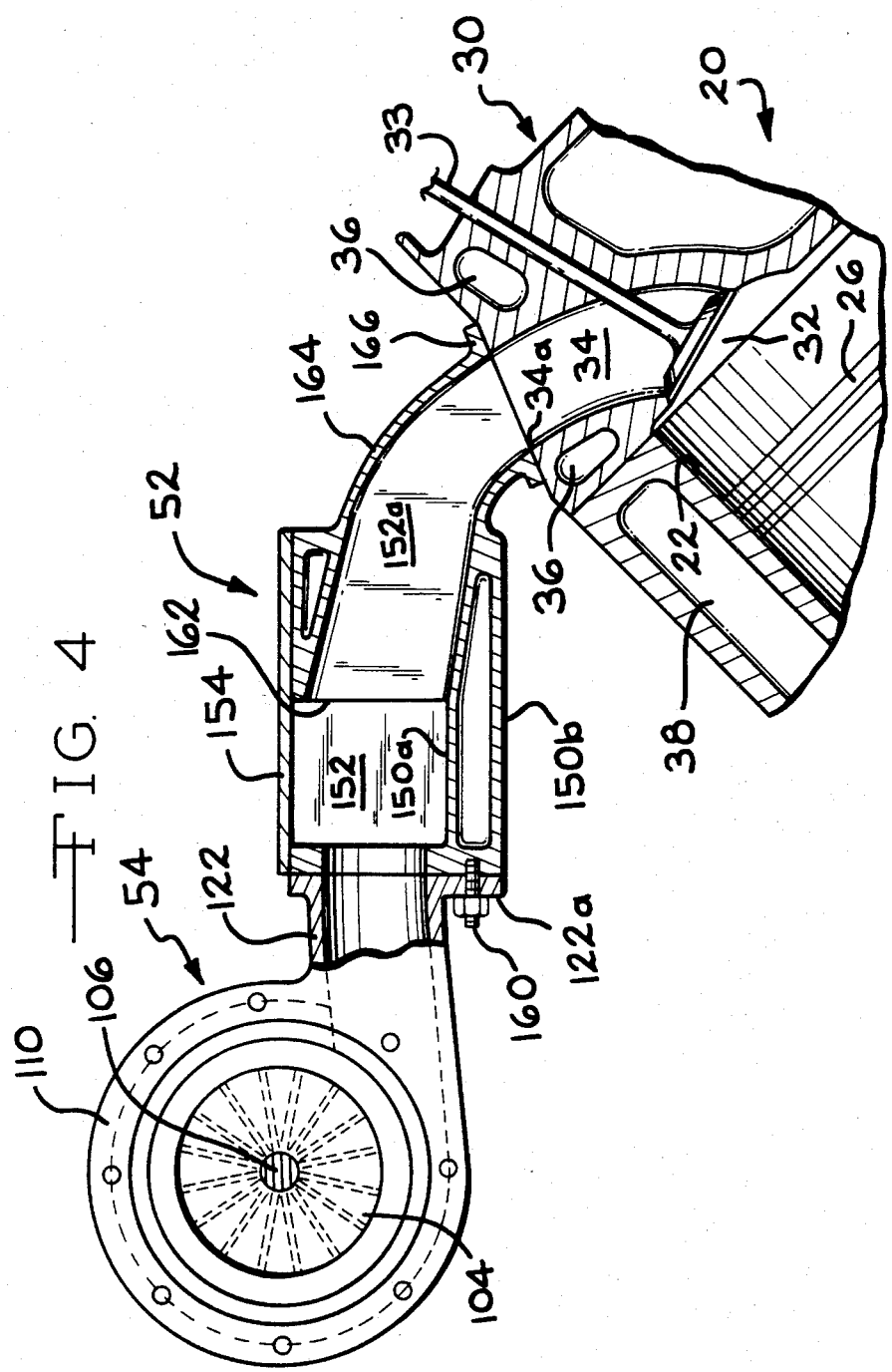
FIG. 4 is a view partly in elevation and partly in section, of fuel mixture homogenizing and heating devices constructed in accordance with the preferred embodiment.

FIG. 1 schematically illustrates an apparatus defining fuel and exhaust flow paths constructed in accordance with the preferred embodiment of the invention. Referring also to FIGS. 3 and 4, the apparatus is connected to an internal combustion engine 20 which in the illustrated embodiment includes three cylinders 22, formed in an engine block 24, each cylinder 22 including an associated piston 26. The pistons 26 are operatively connected to a crank shaft (an output end 28 of the crank shaft is shown in FIG. 3) by connecting rods in the conventional manner so that reciprocal movement in the pistons 26 produces rotary motion in the crank shaft 28.

A cylinder head 30 is suitably fastened to the top of the engine block 24 and defines a combustion chamber 32 in each cylinder 24 (shown in FIG. 4). A pair of cam driven poppet valves 33 (only one valve 33 is shown) controls the inflow of the fuel/air mixture into the combustion chamber 32 and the outflow of combustion products. The head 30 includes integrally formed intake and exhaust passages (only the intake passage 34 is shown). The intake passages 34 extend from ports 34a formed in the side of the cylinder head 30 (shown in FIG. 3) and the intake valves 33. Coolant passages 36 support coolant flow through the head for removing excess heat during engine operation. The coolant is discharged from the cylinder head 30 through an outlet port 36a. The cylinder block 24 also includes coolant passages 38.

Returning to FIG. 1, the present invention provides an apparatus and structure, indicated generally by the reference character 137 that defines a fuel mixture flow path extending between the cylinder intake ports 34a and a fuel introducing device 38, preferably a carburetor. According to the invention, means for thoroughly vaporizing and mixing the fuel mixture as it travels from the carburetor 38 to the engine combustion chambers 32 is provided.

Liquid fuel is delivered to the carburetor 38 from a fuel tank 40 by a conventional fuel pump 42 and associated conduits 44. Preferably, the carburetor 38 operates in a conventional manner and combines controlled amounts of air and liquid fuel to form a combustible fuel mixture.

In general, only a portion of the liquid fuel will be partially vaporized in a throat of the carburetor as it enters the air flow stream. In accordance with the invention, a fuel mixture vaporizer 50 and a fuel mixture heating device 52 are disposed in and preferably form a part of a fuel mixture flow path 37 to insure complete fuel vaporization and to heat the fuel/air mixture above the vaporization temperature of the liquid fuel, preferably to a temperature which is twice the vaporization temperature of the fuel. A fuel mixture homogenizer, indicated generally by the reference character 54 is disposed in the flow path intermediate the vaporizer 50 and the heating device 52.

Figure 2:
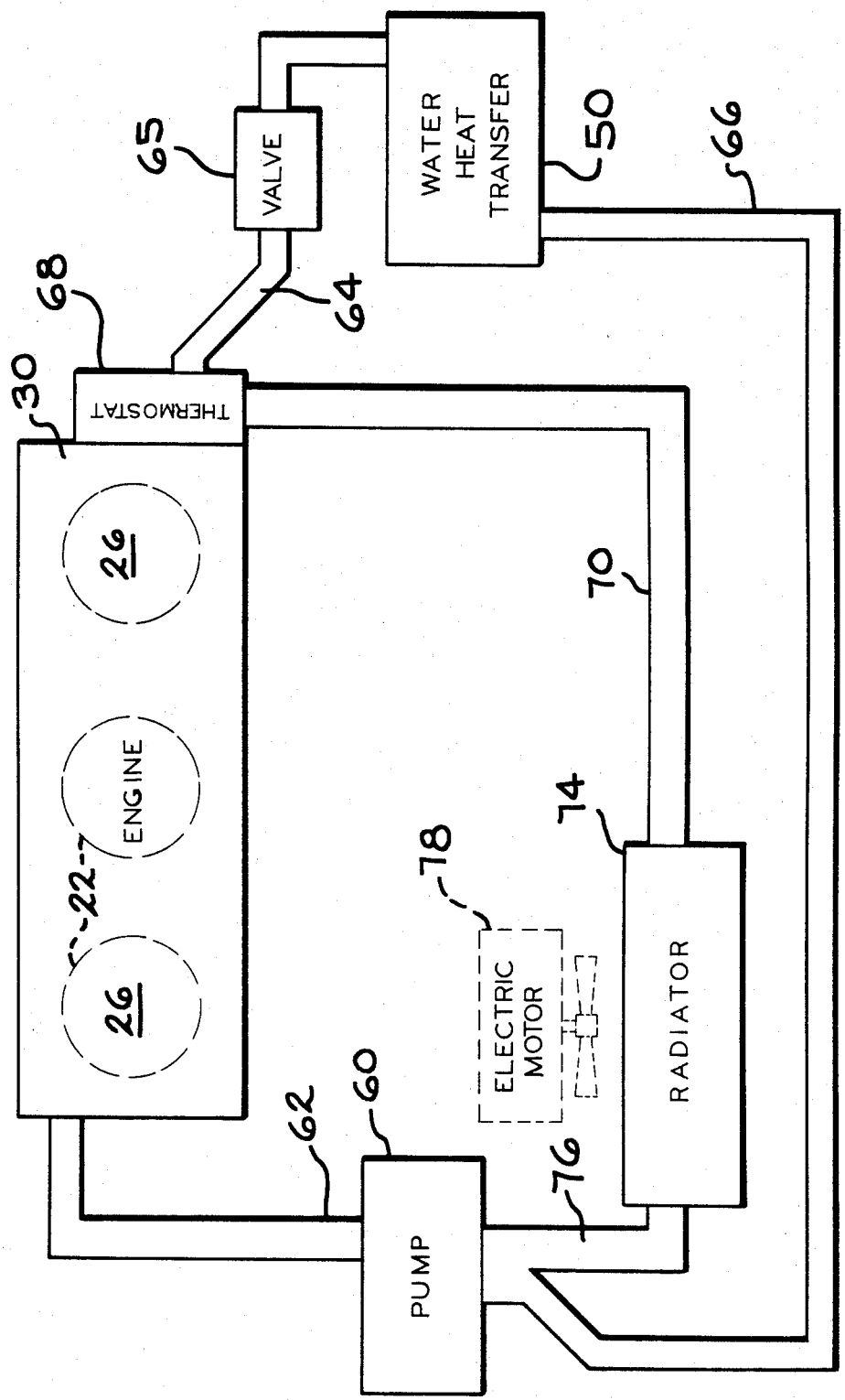
FIG. 2 is a schematic illustration of the engine coolant circuit that provides heat to a fuel mixture vaporizer constructed in accordance with the preferred embodiment of the invention.

In the preferred embodiment the fuel mixture vaporizer 50 heats the fuel mixture with heat from the engine coolant system. The invention does contemplate the use of exhaust heat if coolant heat is unavailable, i.e., in an air-cooled engine. The engine coolant fluid loop for accomplishing this feature of the invention is illustrated in FIG. 2. The cooling circuit includes a conventional water pump 60 for pumping coolant into the engine block 24 and the cylinder head 30. The coolant is delivered to the engine through a supply conduit 62 and is discharged from the head 30 into an outlet conduit 64 through the coolant port 36a formed in the cylinder head 30 (shown in FIG. 3). The outlet conduit 64 has a valve 65 for adjusting the fluid flow through it. The outlet conduit 64 delivers coolant to the vaporizer 50. The coolant circulates through the vaporizer and is subsequently discharged into a return conduit 66. The conduit 66 communicates with the inlet side of the pump.

A thermostat housing 68 including a conventional thermostat (not shown) is provided for controlling the fluid communication between the conduit 64 and a radiator input conduit 70. As long as a coolant remains below a predetermined temperature (determined by the thermostat) the thermostat remains closed and the coolant is conveyed to the input of the coolant pump 60 through the conduit 66. In this operating mode, the coolant circulation loop includes only the pump 60, the engine block and head 24, 30 and the vaporizer 50. Should the coolant temperature exceed the thermostat setting, the thermostat will open and communicate the conduit 70 and the coolant will proceed through a radiator 74 and then be returned to the cooling pump 60 by a radiator return conduit 76. An electrically driven fan 78, controlled by a thermostat (not shown) is shown in phantom. In tests the fan has not turned on so it preferably is eliminated and has for this reason been shown in phantom. It is shown here only because it was present, through inoperative, during tests in which certain data was collected.

Figure 8:
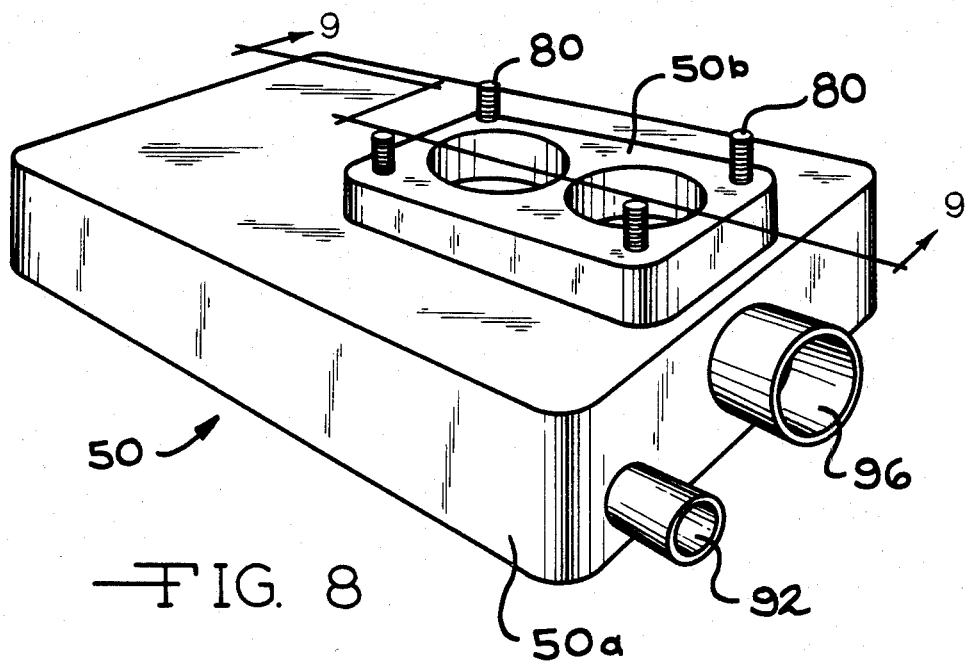
FIG. 8 is a perspective view of the vaporizer of the engine shown schematically in FIG. 1 on an enlarged scale.
Figure 9:
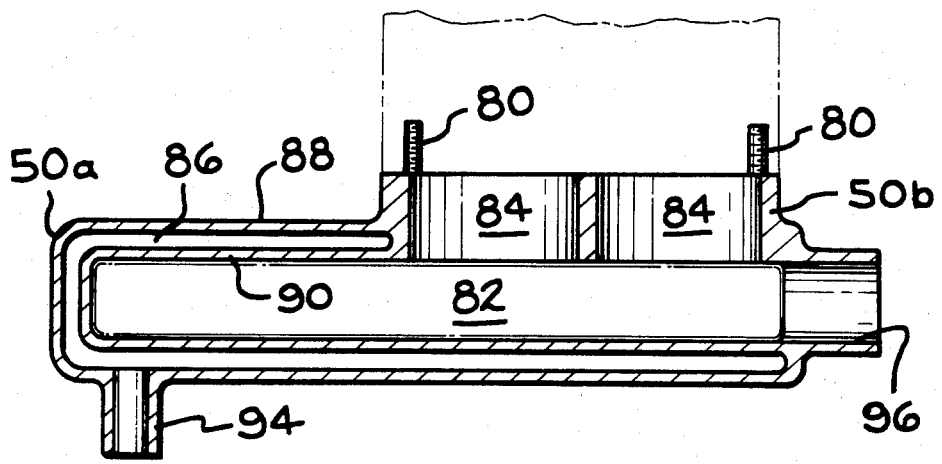
FIG. 9 is a sectional view of the vaporizer as seen from the planes indicated by line 9—9 of FIG. 8.

The mixture vaporizer 50 preferably mounts and forms the support base for the carburetor 38. In accordance with this feature and as seen in FIGS. 3, 8 and 9, the vaporizer 50 includes a housing 50a and an integrally formed carburetor mounted flange 50b including vertically extending retaining studs 80. Referring in particular to FIGS. 8 and 9, the housing 50a defines an interior, heating chamber 82 that communicates with the throat of the carburetor through a pair of passages 84 that extend downwardly from the top of the carburetor flange 50b and open into the chamber 82.

A fluid jacket 86 defined by exterior and interior walls 88, 90 of the housing 50 surround the chamber 82. Engine coolant is circulated in the fluid passages 86 so that heat from the engine coolant is transferred to the chamber 82 through the interior wall 88. The engine coolant is communicated to the vaporizer through an inlet nipple 92 formed in the housing 50a and suitably connected to the outlet conduit 64. The coolant leaves the vaporizer 50 through an outlet nipple 94 (shown in FIG. 9) that is suitably connected to the return conduit 66.

The fuel mixture formed in the throat of the carburetor 39 enters the heating chamber 82 through the passages 84. The mixture leaves the chamber 82 through a chamber outlet 96 formed in the housing 50a and preferably extending in a direction orthogonal to the axes of the passages 84.

Under normal engine operating conditions, it has been found that a substantial portion of the engine heat absorbed by the engine coolant is released to the fuel mixture as the mixture passes through the vaporizer 50. In effect, the coolant heat discharged to the vaporizing fuel partially supplants the need for the coolant radiator 74 and totally supplants the need for the cooling fan 78, thus allowing the use of fewer and smaller components.

It has been found that the coolant flows in many conventional automobiles are excessive, resulting in the loss of large amounts of engine heat to the ambient. This condition is alleviated by the present invention. According to the invention, the coolant flow rate through the engine is proportional to the power output of the engine so that as the engine output increases, proportionately more heat is carried to the fuel mixture preheater 50 for transfer to the incoming fuel charge. This "heat balance" between the coolant flow rate and engine output is achieved by the sizing of the coolant pump 60 and the adjustment of the control valve 65. In actual production, the valve 65 is preferably eliminated by appropriately sizing the various coolant conduits.

Returning to FIG. 1, the homogenizer 54 operates to thoroughly mix the fuel mixture received from the vaporizer 50 and insures that the fuel vapor is uniformly dispersed throughout the fuel/air mixture. Moreover, the homogenizer operates to compress the fuel air mixture thereby increasing the density of the fuel charge entering the combustion chambers 32.

In the preferred embodiment, the homogenizer 54 comprises mixing and exhaust driven turbines 102, 104 fixed to a common shaft 106 and mounted for rotation within a structure that defines separate turbine chambers or housings 108, 110 associated with the turbines 102, 104 respectively. The turbine 104 is disposed in the exhaust flow path and is in part driven by the exhaust gases discharged by the engine 20; the rotation of the turbine 104 produces attendant rotation in the turbine 102. Further rotation producing forces are supplied by the mixture flow across the mixing turbine which results from thermal expansion. The rotation of the turbine 102 stirs or homogenizes the fuel mixture passing through the turbine housing 108 on its way to combustion chambers.

Referring to FIG. 3, the originally preferred exterior construction of the homogenizer 54 is illustrated. The turbine housing 108 includes an axial inlet 120 through which the fuel mixture from the vaporizer 50 is received. The homogenized fuel mixture leaves the turbine housing 108 through a flanged nozzle outlet 122 that extends tangentially from the turbine housing 108. The exhaust turbine housing 110 includes a flanged inlet 124, formed tangentially with respect to the turbine chamber 110. The exhaust gases passing through the housing 110 are discharged through an axial outlet communicating with an exhaust pipe 126. The pipe 126 includes a flange 126a clamped to the axial outlet by means of studs 128. The studs extend from the side of the exhaust turbine housing 110 and are adapted to receive suitable threaded fasteners (not shown). The exhaust gases discharged by engine 20 are conveyed to the exhaust turbine housing by an exhaust conduit 132 that terminates in a flange 132a. A similar flange 124a is mounted at the inlet 124 of the housing 110. The flanges 124a, 132 include a plurality of apertures 125 adapted to receive suitable fasteners for coupling the flanges 124a, 132a. The turbine 104 is rotatably driven by the exhaust gases travelling from the conduit 132 to the conduit 126 and as discussed above, rotation of the turbine 104, in turn, imparts rotation to the mixture turbine 102.

Although the homogenizer 54 bears some physical similarity to a conventional turbocharger, which those skilled in the art will recognize as an exhaust driven supercharger, its primary functions are the homogenization of the fuel mixture and the addition of heat to complete, and assure maintenance of, total vaporization of the fuel. Thus, while there is fuel/air mixture compression, as is the case with conventional turborchargers, this is not the primary function of the homogenizer. In accordance with this feature of the invention, the turbines 102, 104 are sized and selected to rotate at 2,000 to 4,000 rpm with the engine at idle and to rotate under all operating conditions.

The boost pressure provided by the homogenizer under specific turbine speeds is less than the boost pressure that would be provided by a similarly sized turbocharger used with a conventional internal combustion engine. The reason for the reduction in the boost pressure realized by the present invention is due to the conditioning of the fuel mixture by the vaporizer 50. As explained above, the vaporizer 50 adds heat to the incoming fuel mixture that not only vaporizes the liquid fuel entrained in the fuel mixture, but it raises the overall temperature and thus reduces the mixture density. This density reduction results in reduced boost pressure for a given steady state turbine speed when compared with conventional but more importantly results in increased mixing and full vaporization of the fuel/air mixture. This reduction in boost pressure for a given turbine speed is offset by the increase in turbine speed which results in acheving desired boost pressures.

Although the boost pressure is somewhat self limiting by the proper selection and sizing of the turbines 102, 104, a bypass valve 140 is provided on the exhaust turbine housing 110 for bypassing exhaust gas around the housing in the event a malfunction is encountered that produces an excessive boost pressure.

Unlike conventional turbochargers, the output pressure of the homogenizer 54 increases immediately upon the initiation of throttle acceleration. As is known in the art, movement of the throttle produces an immediate injection of fuel via an accelerating pump and/or other acceleration enrichment devices. The addition of fuel to the intake flow path does not simultaneously produce a proportionate increase in air flow through the carburetor. The air flow increases only upon an increase in engine RPM.

In conventional turbocharged engines, the output of the turbocharger will increase only upon an increase in engine RPM which produces the necessary increased exhaust flow. In the present invention, the homogenizer 54 rotates throughout the engine operating range. As explained above, the mixture density is reduced by the vaporizer 50. When acceleration is first initiated, the injected fuel immediately increases the specific density of the fuel/air mixture. This increased mixture density immediately increases the pressure in the homogenizer 54, even though the engine RPM has not yet increased.

The homogenized fuel mixture leaves the turbine housing 108 and enters the fuel mixture heater 52. Referring to FIGS. 3, 5, 6 and 7, the fuel mixture heater 52 functions somewhat as an intake manifold for the cylinder head 30 in that it divides and distributes the fuel mixture to the individual cylinders 22.

In the preferred embodiment, the fuel mixture heater 52 comprises an exhaust heated housing 150 that includes spaced interior and exterior walls 150a, 150b, respectively, between which are defined passages through which exhaust gases circulate to heat an interior chamber 152 defined by the interior wall 150a and a cover plate 154 (shown in FIG. 3) fastened to the top of the housing 150 by suitable fasteners 156. The fuel mixture is communicated to the chamber 152 through an inlet aperture 158 formed in the side of the housing 150. A plurality of laterally extending studs 160 extend from the side of the housing 150 and attach the mounting flange 122a of the homogenizer outlet 122 to the housing 150.

A pair of vertically standing ribs 162 are disposed in the chamber 152, a spaced distance from the aperture 158. The ribs 162 subdivide the mixture flow into a plurality of branch flow paths 152a, each path communicating with one of the three combustion chambers 22. Preferably, relatively short, individual conduits 164 extend between the housing 150 and a mounting flange 166 adapted to be attached to the side of the head 30, as seen in FIG. 3. Each conduit 164 communicates one of the branch flow passages 152a with one of the cylinder head intake ports 34a. A nipple 170 is also mounted to the flange 166 and communicates the coolant discharge port 36a in the cylinder head with the conduit 64 (shown in FIG. 2).

Figure 5:
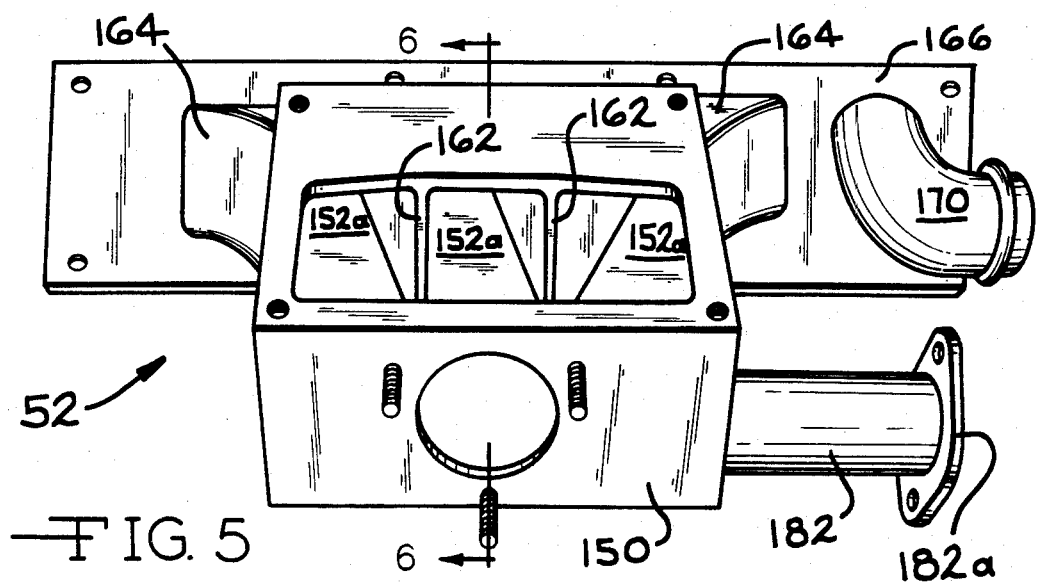
FIG. 5 is elevational view of the fuel mixture heater, with parts removed to show interior detail.
Figure 6:
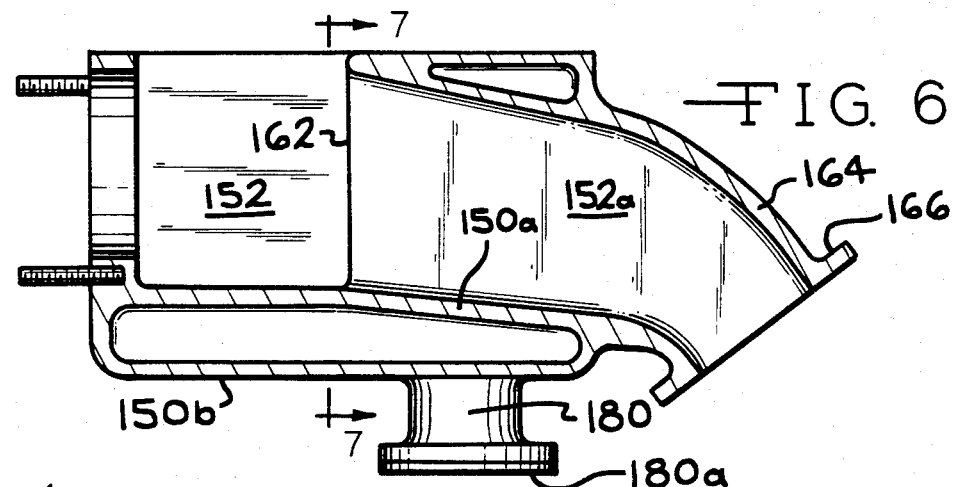
FIG. 6 is a cross sectional view of the fuel mixture heater as seen along the plane indicated by the line 6—6 of FIG. 5.
Figure 7:
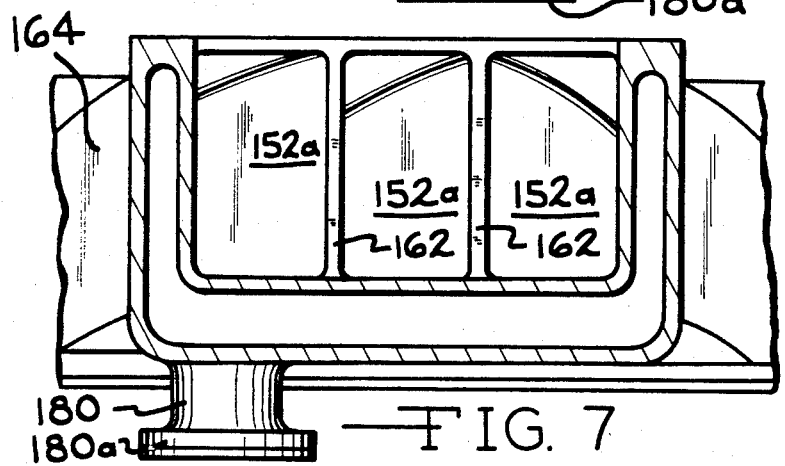
FIG. 7 is a sectional view of the fuel mixture heater as seen from the plane 7—7 of FIG. 6.

The path of exhaust gas flow to the fuel/air mixture heater 52 and the homogenizer 54 is shown schematically in FIG. 1. The exhaust conduit 132 extends into fluid communication with a plurality of exhaust ports (not shown) formed in the cylinder head 30 through three branch conduits 174, terminating in mounting flanges 174a. The branch conduits have elongated straight sections adjacent the flanges to minimize back pressure. As seen in FIG. 3, the left end of the conduit 132 is fitted with a coupling flange 176. A short nipple 178 and associated flange 178a extend from the side of the conduit 132 about midway between the ends. As also seen in FIGS. 5 and 6, a pair of relatively short conduits 180, 182 fitted with mounting flanges 180a, 182a extend downwardly and laterally from the heater housing 150, respectively.

A conduit 184 (shown schematically in FIG. 1) communicates exhaust gas from the left end of the conduit 132 to the conduit 180. The outlet 182 is coupled directly to the flange 178a of the conduit 178 extending from the side of the conduit 132 and forms a return path for the exhaust gases. A pair of suitable flow control valves 186, 188 are disposed in the conduits 184, 132 and are used to adjust the exhaust flow in the respective conduits. The valve 186 controls the amount of exhaust gas that is communicated to the fuel mixture heater 52. By properly adjusting the respective valves a heat balance is obtained wherein the exhaust gas conveyed to the heater 52 will deliver the requisite amount of heat to the fuel mixture, the heat delivered being a function of the power output of the engine. In actual mass production of the engine, the valves 186, 188 are preferably eliminated by suitably sizing the conduits 132, 180, 182 and 184 to achieve the requisite flow rate of exhaust gas through the fuel mixture heater 52. While insulation is not shown for clarity, all of the exhaust gas conduits are preferably insulated further to minimize heat losses.

Turning now to FIG. 4, the profile of the fuel mixture flow path between the homogenizer 54 and the combustion chamber 32 is detailed. The geometry of the disclosed flow path minimizes energy losses because the mixture flow encounters very little path deviation. The fuel mixture leaves the homogenizer 54 along a tangential path defined by the nozzle outlet 122 and enters the fuel mixture heating chamber 52 along a substantially straight path. The branch flow paths 152a extend substantially equal distances to the conduits 164 and flare outwardly from the axis of the nozzle outlet flow less than 8°. The branch flow paths 152a, the conduits 164, and the cylinder head intake passages 34 define a gradual, downwardly curving flow path that extends between the chamber 152 and each combustion 32. In traversing this flow path, the fuel mixture sustains very little frictional or other energy losses. It is believed that this flow path construction optimizes the combustion process for the mixture enters the combustion chamber thoroughly mixed, uniformly dispersed and completely vaporized. Flow through the heating chamber is laminar.

According to a feature of the invention, direct, uncontrolled heat transfer between the turbine housing 108 and the vaporizer 50 is inhibited by a thermal isolator. In particular, referring to FIG. 3, a circular flange 200 including a plurality of apertures 202 and a centrally located nipple 204 is suitably fastened to the inlet 120 of the turbine chamber 108. A relatively short conduit 206 constructed from a material having a relatively low thermal conductivity is clamped to and extends between the vaporizer outlet 96 and the turbine inlet nipple 204 by suitable clamps (not shown). Preferably, the conduit 206 is constructed from an elastomeric material and provides an added feature of the invention.

Not only does the conduit 206 thermally isolate the vaporizer 50 from the turbine housing 108 it also provides vibration isolation and thereby isolates the carburetor 38 from engine vibration that would otherwise be transmitted from the turbine housing 108 to the vaporizer 50. The heat isolation provided by the conduit 206 prevents the uncontrolled heat transfer to the bowl of the carburetor 38 that could cause fuel percolation or vapor lock. Moreover, the vibration isolation provided by the preferred conduit construction should reduce the need for carburetor readjustment and improve the overall reliability and calibration of the fuel system.

It should now be recognized that the present invention provides a method for operating an internal combustion engine that increases the overall efficiency of the engine by optimizing the combustion process. According to the disclosed method, a controlled amount of liquid fuel, such as gasoline, is introduced into the intake system of an engine and mixed with a controlled amount of air to form a combustible mixture. The air and entrained fuel are then heated by transferring heat from the engine coolant system, or alternately from the engine exhaust system to encourage the vaporization of the liquid fuel. The mixture is then stirred and homogenized so that the vapor is uniformly distributed throughout.

The homogenized mixture is then further heated to increase the overall temperature of the fuel mixture well above the vaporization temperature of liquid fuel. Preferably, the mixture is heated to at least twice the vaporization temperature of the liquid fuel with the fuel air mixture reaching about 400° F. in the mixture heater when the fuel is 93 octane unleaded gasoline. Movement of the fuel/air mixture is important to permit mixture temperatures of this magnitude without reaction. Mixture velocities in the disclosed engine are such that the temperature should be kept below 440° F. to avoid reaction of the mixture in the heating chamber. It should be noted that the average vaporization temperature of currently available gasolines (at sea level) is approximately 110° F. The heating of the fuel mixture not only insures complete fuel vaporization but it also adds energy to the fuel mixture that would otherwise be lost to the engine exhaust and cooling systems. In short, the fuel/air mixture enters the combustion chambers with a higher energy content. Since the mixture has a higher energy content, less fuel is needed to produce the desired temperature and pressure levels in the combustion chamber.

In order to achieve the optimum energy output during combustion, the present invention also provides method steps for operating the engine which optimize the combustion process. By optimizing the energy output, it has been found that the amount of waste heat discharged through the engine cooling system and otherwise is reduced thus contributing to the reduction in radiator size and fan elimination.

According to these additional steps, the volume of the combustion chamber is held substantially constant at or near its minimum volume during the combustion process so that the gases and products of the combustion reaction substantially reach their maximum temperature and pressure. The hot gases generated during this optimized combustion process are allowed to expand substantially at a constant volume at a time commencing before there is any significant drop from the maximum temperature and pressure. In order to accomplish combustion optimization, the crank shaft stroke and piston rod length are selected so that the piston remains within 0.001" of top-dead-center (TDC) for about 13° of crank shaft rotation or longer.

The position of the wrist pin in the piston as well as the piston radial clearance have been found to affect piston "dwell time" at TDC. In particular, offsetting the wrist pin position to accommodate a longer rod length increases piston dwell. Increasing the piston radial clearance allows the piston to "rock" and also increases piston dwell.

This "piston dwell" parameter is determined by directly measuring the piston movement near TDC relative to crankshaft rotation, with the engine head removed, i.e., using a dial indicator. It will be recognized that during engine operation, the actual piston dwell at TDC may be different than measured because, with pressure on top of the piston, relative motions of the moving parts may be somewhat different. However, it is believed the difference, if any, is not significant and it is certain that top center dwell time is increased over conventional engines. It has been found through experience and experimentation, that sizing the piston stroke and rod length to arrive at the dwell measurements stated above, will produce the desired increase in combustion efficiency. Using this sizing criteria and measurement technique, an internal combustion engine utilizing gasoline for fuel and operating at a speed range of between 800 and 4,000 rpm, fuel efficiency as well as power output is substantially increased.

Such an engine is more accurately termed an expander because the piston leaves TDC when pressure is essentially at its maximum so that extraction of power from the working fluid is maximized due to maximization of its expansion. It is this expansion which results in a smooth vibration free operation without counterweighting used by others to attempt to approach the smoothness of the engine disclosed here.

Figure 10:
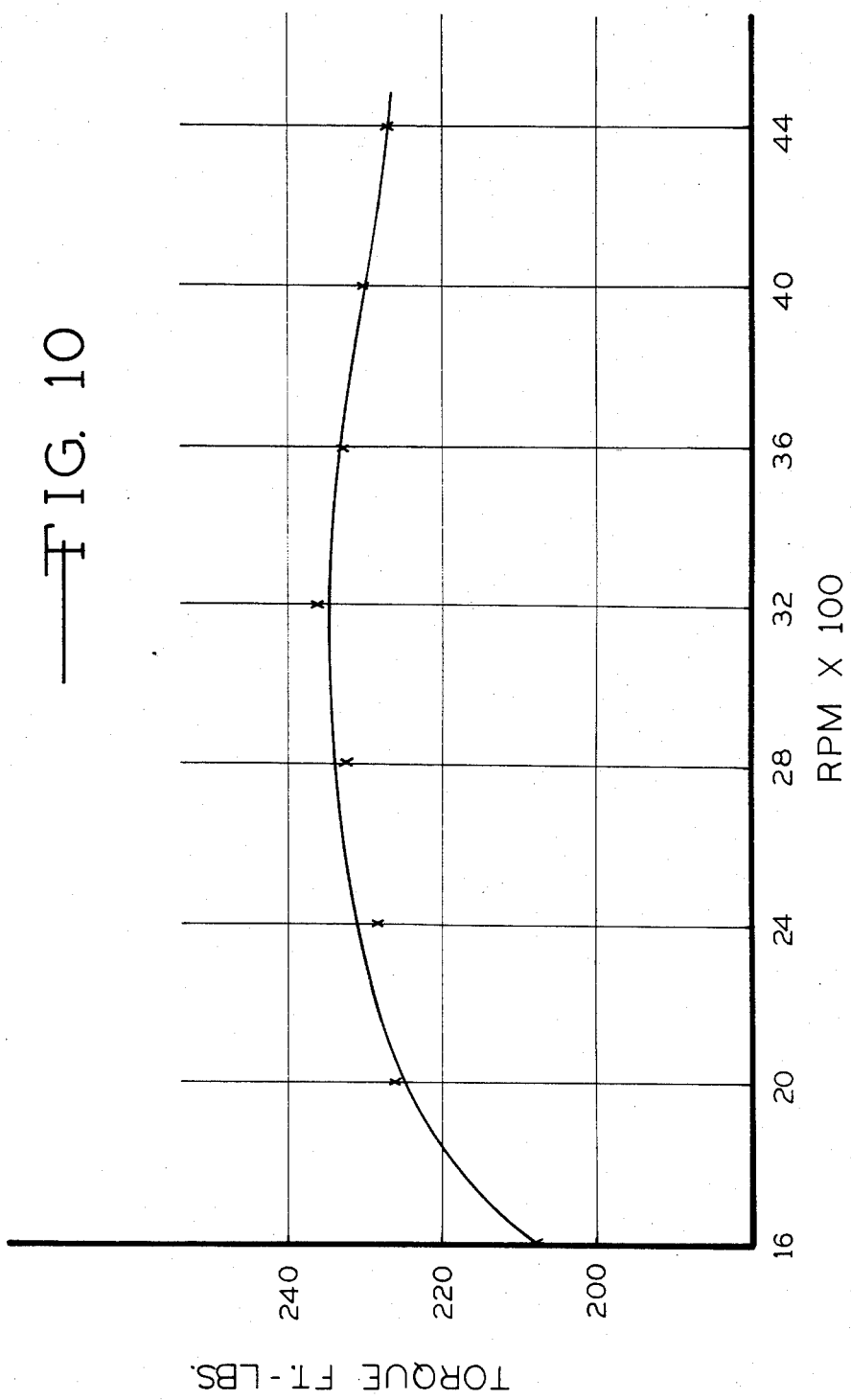
FIG. 10 is a graph depicting a measured torque curve of the engine of this invention.

An engine and fuel system embodying the present invention was constructed and installed in a 1980 Buick Skylark. The vehicle weighed 3,005 lbs, two passengers, full fuel accelerated 0-060 M.P.H. in 9.4 seconds. The mechanical parameters for the engine are listed in Table I. A measured torque curve is illustrated in FIG. 10 and indicates a remarkably level torque output, in excess of 225 ft-lbs, for an operating range of 2000-4400 rpm. Those in the art will recognize that the disclosed power output for a three-cylinder engine having a displacement of 125 cubic inches and weighing only 320 lbs. in its operating mode including clutch and bell housing is substantially more than one would expect from an engine this size. Moreover, it was found that the engine was remarkably vibration free and the radiator with which the above identified vehicle was originally equipped was reduced in size and capacity by about 50%.

TABLE I

Engine Type: 3 cyl, overhead valve
Displacement: 125 cu. in.
Bore: 3.950 in.
Stroke: 3.4 in.
Rod length: 6.5 in.
Horsepower: 240 Hp at 4000 RPM (special high performance fuel-test code 20 with 21 pound boost)
Horsepower: 190 Hp at 4400 RPM (93 octane unleaded gasoline with 10 pound boost)
Weight: 320 lbs.
Fuel economy: 48.25 MPG (combined city and highway)

In order to achieve the earlier discussed "piston dwell" of 0.001" piston movement at TDC for 13 degrees of crankshaft rotation, the wrist pin position is offset approximately 0.060" in the direction in which thrust is applied to the piston from the diametric center of the piston to accommodate a rod length of 6.5". Additionally, a piston radial clearance of 0.006" was selected to provide a small amount of piston "rock" which adds to the piston dwell. The combined effects of the offset and clearance permit thrust forces to offset the piston as the rod connected crank journal passes over dead center resulting in a closer spacing of piston top to journal axis than in the case with conventional construction. After the journal passes dead center the thrust forces are relieved and the piston centers itself. This centering action has a movement vector away from the journal and therefore it assists in maintaining the piston near top-dead-center.

A mileage test for the vehicle was conducted using a 133 mile driving loop that included both city and highway speeds. The vehicle drive train, i.e., transmission, differential gearing, etc. was standard an unmodified. Slightly larger diameter, commonly available, tires were used in the test. With a final drive ratio of 2.3-1, the engine R.P.M. at 55 M.P.H. is 2,000. The vehicle speed was maintained within 2 mph of the posted speed limit. One hour and forty minutes of the test was spent in city traffic and an equal amount of time was spent in highway traffic. The 133 mile test loop was repeated 10 times and at the conclusion of the test it was found that the vehicle averaged 48.25 miles per gallon. The disclosed performance gains in both fuel economy and power output were obtained without sacrificing driveability.

It was also found that the engine was not prone to detonation even under high engine loads and low engine rpm. Moreover, the vehicle could be smoothly accelerated in high gear, from a road speed of 20 MPH, under both part and full throttle, without evidence of engine hesitation or flutter. The constant downshifting to maintain sufficient engine RPM often required with conventional, small displacement engines was found to be unnecessary.

It is believed that the apparatus and method disclosed by this present invention optimizes engine performance by controlling flame speed during combustion. This control is achieved by the thorough preparation and mixing of the fuel mixture prior to entry into the combustion chamber so that the mixture inducted into the chamber is homogenous and burns at a controlled rate throughout the engine operating range. The heat energy contained in the engine coolant and exhaust systems is utilized in the preparation process and is added to the fuel mixture to increase its energy output.

This is achieved by sizing and adjusting the coolant and exhaust heat loops to produce a "heat balance" wherein the engine heat normally discharged to the ambient (by the exhaust and coolant systems) is conveyed to the incoming fuel mixture to insure thorough mixing and vaporization. More importantly, the heat loops are critically adjusted to produce heat transfer flow rates that are proportional to the power output of the engine. Thus as the output increases, the amount of heat transferred to the incoming fuel mixture increases proportionately. In short, an internal combustion engine utilizing the present invention operates as a "hot vapor cycle" engine. The apparatus disclosed, not only insures complete fuel vaporization and mixing but also heats the fuel vapor well above the vaporization temperature of the fuel.

While it is believed the engine which has been described is, if fine tuned, fully capable of meeting present and contemplated EPA regulations a test engine was constructed in which the engine which has been described was fitted with mechanisms designed to provide exhaust gas recirculation (EGR) and intake air heating. These provisions are designed primarily only to meet so called "cold start" test requirements and, again, can be eliminated by fine tuning of the engine previously described.

A modified homogenizer 210 is provided. The homogenizer 210 has an outer housing 212 which defines an air passage 213 between the homogenizer housing 212 and an exhaust gas and turbine surrounding housing 214.

The homogenizer housing 212 includes a pair of air inlet passages 216. The air inlet passages 216 are positioned on opposite sides of homogenizer connection to the exhaust conduit 132 to entrain ambient air for heating as it passes through the air passage 213.

The homogenizer includes a heated air outlet 218 which is opposite the exhaust conduit 132 so that the distance from each of the two inlets 216 to the common outlet 218 is equal. Air which has been warmed by the homogenizer passes through the outlet 218 thence through a connected air conducting conduit 219 to a carburetor air intake manifold 220. The carburetor air intake manifold 220 has an ambient air intake 222 through which unheated ambient air can pass to be delivered to the carburetor.

A temperature responsive air intake control valve 224 modulates the supply of ambient air through the passage 222. Normally on startup the intake valve 224 remains in a closed condition so the only air supplied to the carburetor is air preheated by passage through the air heating passage 213. Once this air reaches that desired temperature of about 110° F. the valve will open. If the engine is operating in cool or cold climates the intake valve will modulate to maintain intake air temperature of about 110° F. during normal operating conditions.

On occasion, as an example during acceleration, air supplied through the air passage 213 and the air conduit 219 may not be adequate for operating conditions. Accordingly the intake valve 224 is also vacuum sensitive and when engine manifold pressure drops below 4 inches the intake valve opens to allow additional ambient air to be entrained into thecarburetor through the intake passage 222 and the carburetor air intake manifold 20.

Figure 11:
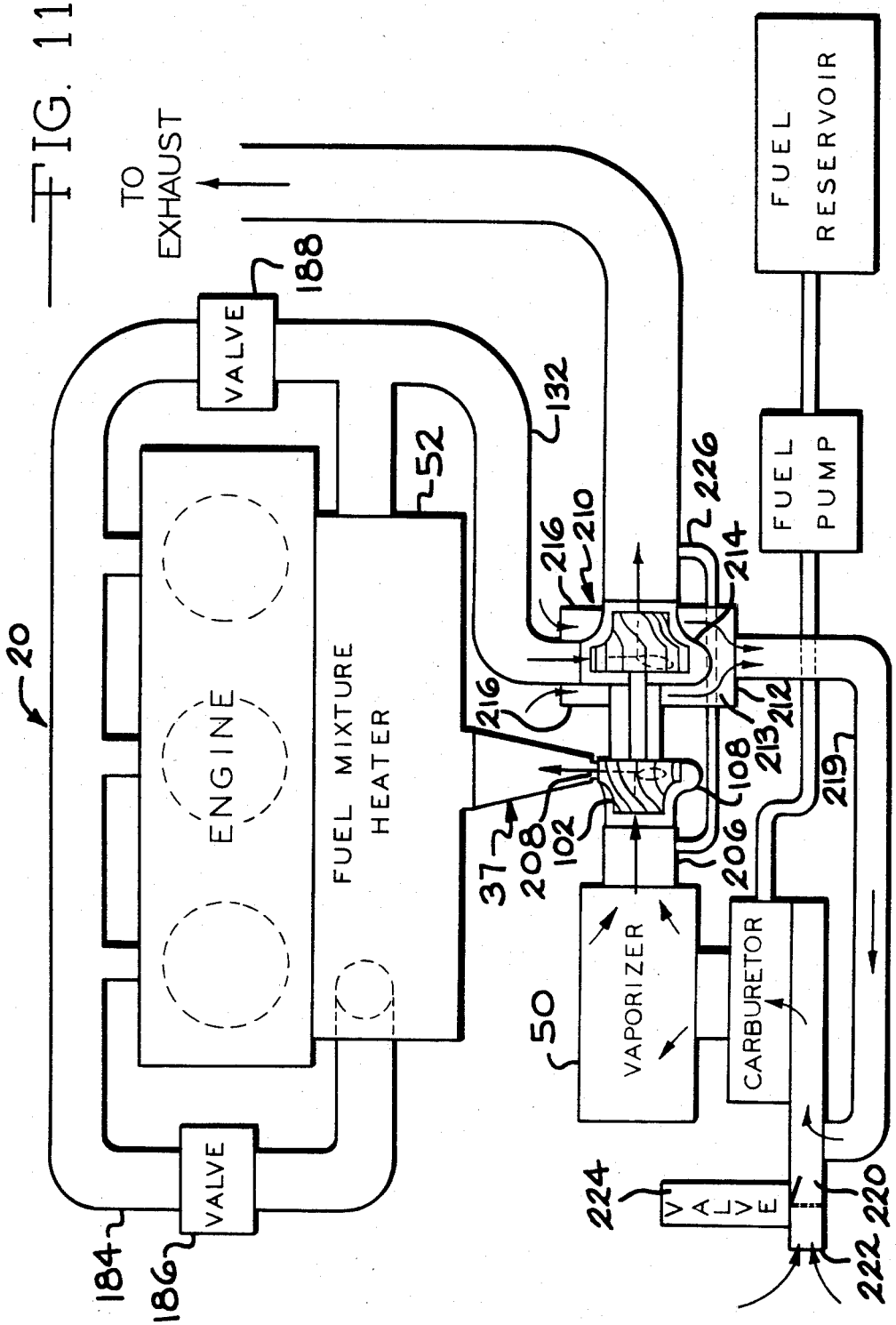
FIG. 11 is a schematic view of a refined version of the engine of this invention.
Figure 12:
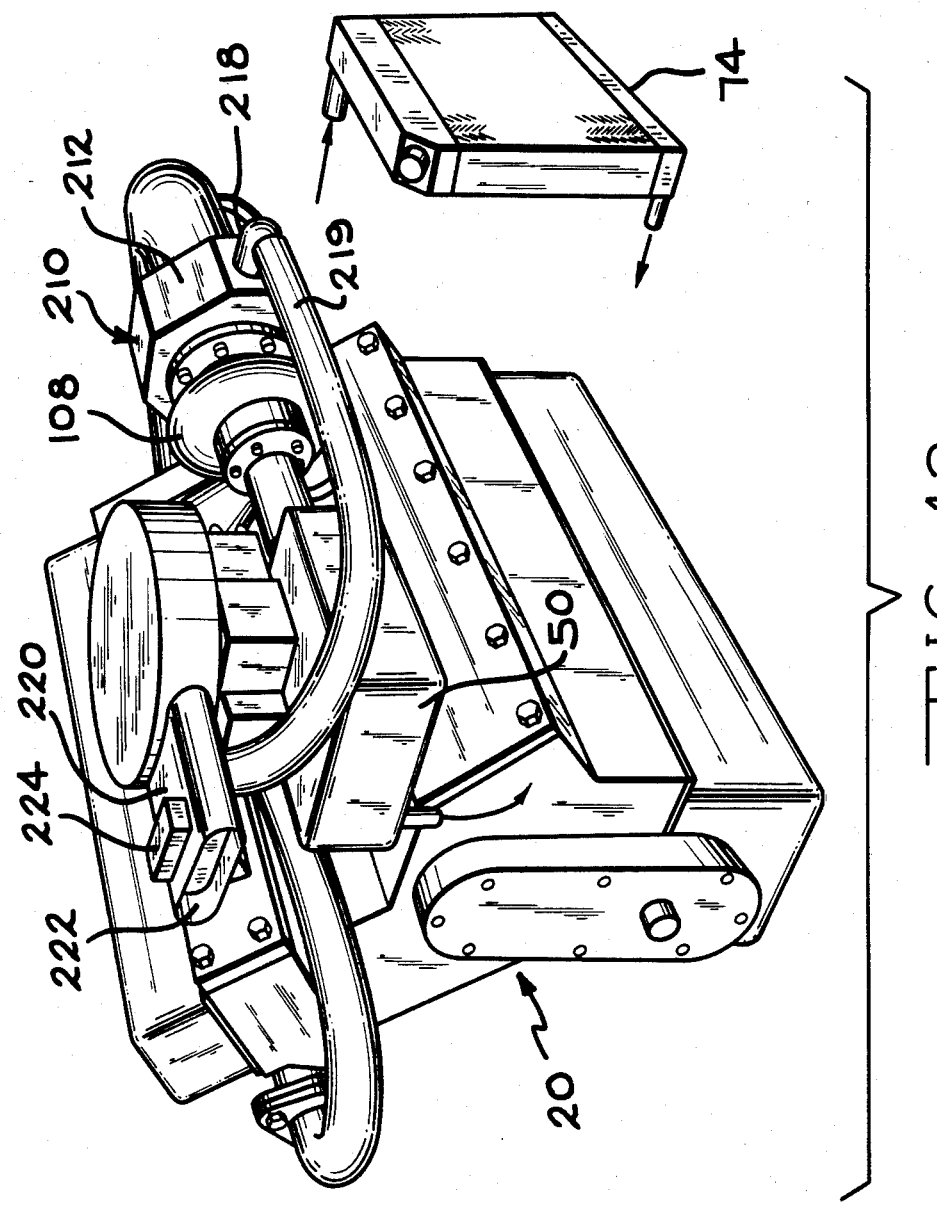
FIG. 12 is a perspective view of the engine of FIG. 11.
Figure 13:
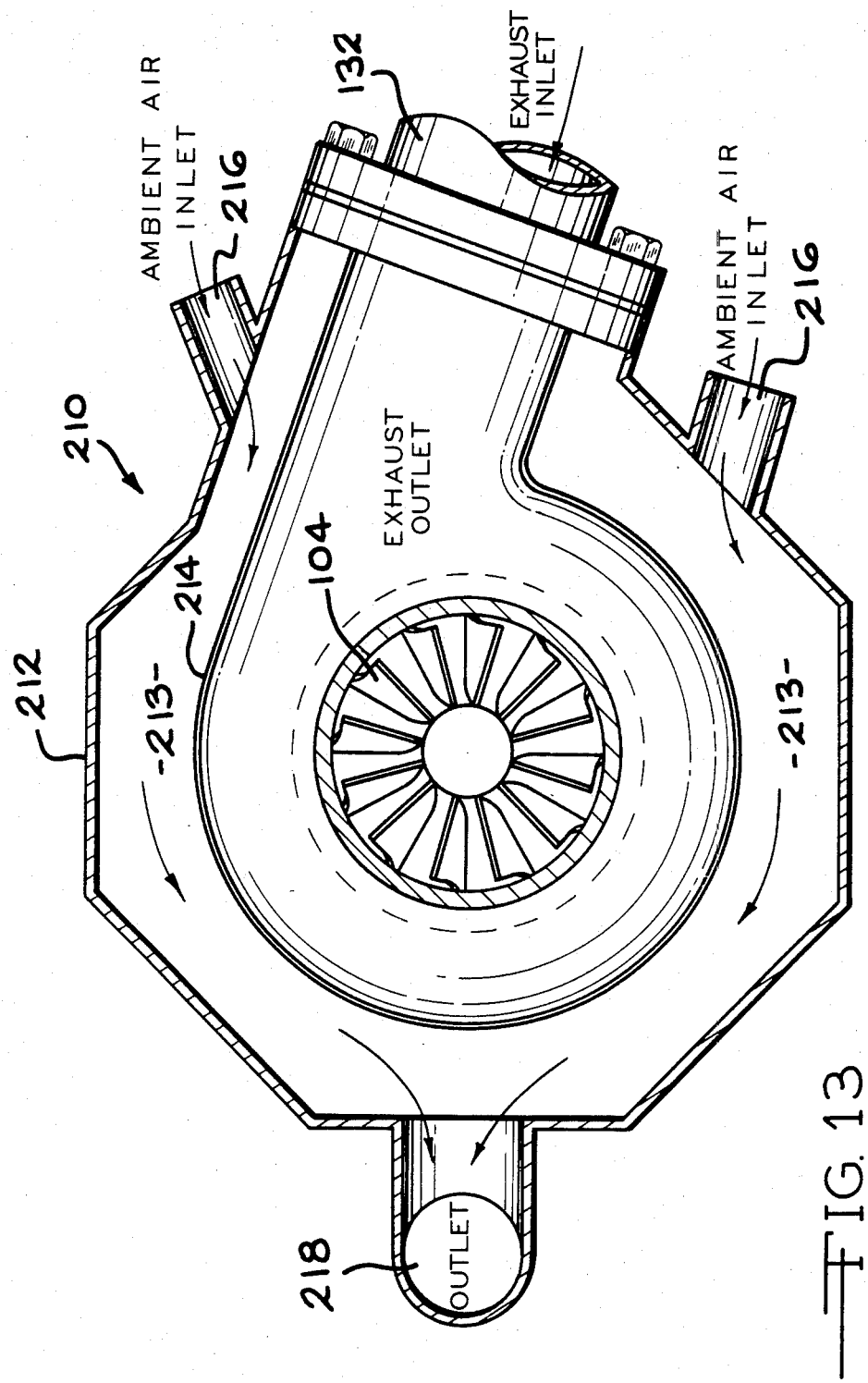
FIG. 13 is an enlarged sectional view of the homogenizer of the engine of FIGS. 11 and 12.

An EGR conduit 226 is provided, FIG. 11. This EGR 226 conducts exhaust gasses from the outlet side of the homogenizer to the inlet side of the chamber in which the compressor turbine 102 is located. This assures that recirculated exhaust gasses are thoroughly admixed with the fuel air mixture supplied to the engine and that such recirculated exhaust gasses are equally distributed to each of the reaction chambers.

The EGR conduit 226 is shown only schematically in FIG. 11. In practice, the connection of the EGR conduit 226 to the fuel air conducting conduit 206 or the compressor turbine housing 108 is located such that EGR fluids are directed toward the compressor chamber. The axis of the EGR inlet is at an angle of less than 45° with the axis of the fuel air conduit 206 and the two axes are located in a common plane which includes the axis of the turbine 102.

The configuration of the compressor turbine housing and its mating with the compressor turbine is best illustrated in FIG. 11. The housing 108 includes an outlet opening 208 in a portion of the housing which fits closely with the compressor turbine 102. The outlet provides a constricting orifice for assisting in isolating the vaporizer 50 from low manifold pressures. In the test engine used to produce the test data presented previously, the compressor turbine was 2.2 inches in diameter. The outlet 208 was one inch in diameter and was followed downstream by housing walls of a frusto conical shaped contour. These housing walls flare from the one inch outlet opening 208 to a two inch diameter in an axial length of one inch. Thereafter the outer side walls of the two outer flow paths 152a flare outwardly at 8° or less within the interior of fuel mixture heater 152.

Although the invention has been described with a certain degree of particularity, it is understood that various changes can be made to it by those skilled in the art without departing from the spirit or scope of the invention as described and hereinafter claimed.

I claim:

1. An electric ignition, internal combustion engine, comprising:
    (a) a plurality of reciprocating pistons for imparting rotational forces to a crankshaft;
    (b) a combustion chamber associated with each piston;
    (c) structure defining a fuel mixture flow path including an inlet and extending into fluid communication with each combustion chamber through a valve controlled port;
    (d) fuel mixture introducing means disposed near said inlet for introducing predetermined portions of air and a vaporizable fuel into said flow path;
    (e) the structure including:
        (i) a fuel mixture vaporizer for transferring heat absorbed by said engine coolant system to said fuel mixture;
        (ii) a fuel mixture homogenizer disposed in said flow path intermediate said fuel mixture vaporizer and said combustion chamber, the homogenizer being driveable by a power source to compress and mix the mixture and maintain a pressure differential across the homogenizer, the homogenizer also being adapted to be heated by heat exhausted by the combustion chambers and including structure for transferring heat to the mixture; and,
        (iii) a fuel mixture heater disposed intermediate said fuel mixture homogenizer and said combustion chambers for transferring further heat exhausted by said combustion chambers to said fuel mixture.

2. A method of operating a spark ignition, internal combustion engine having at least one combustion chamber, a reciprocally movable piston associated with the chamber, a fluid coolant system and an exhaust system for discharging combustion gases from the combustion chamber, comprising the steps of:
    (a) providing a fuel mixture flow path extending between a fuel mixture inlet and said combustion chamber;
    (b) introducing air and a vaporizable fuel into said inlet in predetermined portions to form a combustible fuel mixture, the fuel having a given vaporization temperature at sea level;
    (c) preheating said fuel mixture near said inlet by transferring heat from said fluid coolant system to said fuel mixture to aid fuel vaporization;
    (d) homogenizing and further heating said preheated fuel mixture and urging said heated fuel mixture towards said combustion chamber by a pumping means driven by a means external to said fuel mixture flow path;
    (e) still further heating said homogenized fuel mixture to a temperature greater than the given vaporization temperature of said fuel by transferring heat from said exhaust system to said fuel mixture; and,
    (f) admitting said fuel mixture into said combustion chamber at predetermined intervals.

3. The method of claim 2 further comprising the step of:
    maintaining the piston within 0.001 inches of top-dead-center for about 13° of crankshaft rotation or longer as directly measured with a dial indicator.

4. A method of providing a vaporized fuel and gas mixture to an internal combustion engine comprising:
    (a) entraining fuel having a given vaporization temperature at sea level in a flow of gases including oxygen for reacting with the fuel;
    (b) heating the gases and fuel with heat energy derived from the engine as the fuel and gases flow along a path;
    (c) admixing the fuel and gases to produce a substantially homogenous mixture of fuel and gases and inhibiting reverse flow of said mixture by passing said fuel mixture through a pumping means driven to maintain a pressure differential across it and along said path;

(d) further heating the mixture as it is admixed and thereafter still further heating the mixture with further heat energy derived from the engine to a temperature well in excess of the given vaporization temperature of the fuel; and, (e) introducing the mixture while heated into a combustion chamber whereby to provide a method of operating an engine in which all fuel is fully vaporized before it is introduced into the combustion chamber and once vaporized remains vaporized.

5. The method of claim 4 wherein at least some of the heat energy is derived from engine exhaust gases.

6. The method of claim 4 wherein at least some of the heat is derived from engine coolant.

7. A method of operating an internal combustion engine comprising:

(a) entraining fuel having a given vaporization temperature of sea level in a flow of gases including oxygen for reaction with the fuel;

(b) heating the gases and fuel with heat derived from the engine as the fuel and gases flow along a path;

(c) admixing the fuel and gases to produce a substantially homogenous mixture of fuel and gases and inhibiting reverse flow of said mixture by passing said fuel mixture through a driven pumping means to increase the pressure of the mixture as it moves along said path;

(d) further heating the mixture as it is admixed and thereafter still further heating the mixture to a temperature in excess of the given vaporization temperature of the fuel after it has been admixed;

(e) introducing the mixture while heated into a combustion chamber;

(f) utilizing an electrical charge to ignite the mixture while in the combustion chamber;

(g) maintaining the volume of the chamber substantially constant until the reaction between the fuel and oxygen has caused the hot gases in the chamber including products of the reaction to substantially reach their maximum temperature and pressure; and, (h) allowing such hot gases to expand from the substantially constant volume at a time commencing before there is any significant drop from such maximum temperature and pressure whereby to provide a method of operating an engine in which all fuel is fully vaporized before it is introduced into a combustion chamber and once vaporized remains vaporized and in which the expansion of such hot gases is optimized.

8. The method of claim 7 wherein such hot gases are allowed to expand until substantially all the useful expansion force available is used to drive the engine and thereafter conducting at least a portion of the residual gases to chambers wherefrom heat is transferred to further fuel air mixtures prior to their introduction into a combustion chamber.

9. The method of claim 7 wherein the still further heating step is performed along a straight path.

10. The method of claim 9 wherein there are a plurality of combustion chambers and the fuel air mixture is at least in part conducted along separate paths with each separate path paired with a different chamber and wherein the paths are of substantially equal length.

11. The process of claim 2 wherein the fuel is gasoline and the mixture is heated to at least about 400° F.

12. A method of operating a spark ignition, internal combustion engine having at least one combustion chamber, a reciprocally movable piston associated with the chamber, a fluid coolant system and an exhaust system for discharging combustion gases from the combustion chamber, comprising the steps of:

(a) introducing through an inlet into a fuel mixture flow path extending to said combustion chamber, air and a vaporizable fuel in predetermined proportions to form a combustible fuel mixture, said fuel having a given temperature of vaporization at sea level;

(b) preheating said fuel mixture near said inlet by transferring heat from said engine to said fuel mixture to aid fuel vaporization;

(c) homogenizing, compressing and further heating said preheated fuel mixture by heating and driving a pumping mechanism with gases from said exhaust system;

(d) inhibiting reverse flow of said mixture in said flow path by driving said pumping mechanism to render it at least partially effective at all engine speeds;

(e) still further heating said homogenized and compressed fuel mixture to a temperature substantially in excess of the given vaporization temperature of said fuel, by transferring heat from said exhaust system to said fuel mixture; and, (f) admitting said fuel mixture into said combustion chamber at predetermined intervals.

13. An electric ignition, internal combustion engine, comprising:

(a) a plurality of reciprocating pistons for imparting rotational forces to a crankshaft;

(b) a combustion chamber associated with each piston;

(c) structure defining a fuel mixture flow path including an inlet and extending into fluid communication with each combustion chamber through a valve controlled port;

(d) fuel mixture introducing means disposed near said inlet for introducing predetermined portions of air and a vaporizable fuel into said flow path;

(e) a fuel mixture vaporizer for transferring heat derived from said engine to said fuel mixture;

(f) a fuel mixture homogenizer driven by gases exhausted by said combustion chambers, disposed in said flow path intermediate said fuel mixture vaporizer and said combustion chambers, said fuel mixture homogenizer being operative to admix said vaporized fuel and air and operative to exert pumping forces on said fuel mixture to urge it towards said combustion chambers and being further operative to resist reverse flow of said mixture;

(g) a fuel mixture heater disposed intermediate said fuel mixture homogenizer and said combustion chambers for transferring heat exhausted by said combustion chambers to said fuel mixture;

(h) said fuel heater comprising a chamber including means for subdividing said flow path into branch flow paths, each combustion chamber communicating with one of said branch flow paths; and, (i) thermal isolating means disposed in said flow path intermediate said fuel mixture vaporizer and said fuel mixture homogenizer operative to resist the flow of heat to said fuel mixture introducing means from said flow path, downstream of said fuel mixture introducing means.

14. An electric ignition, internal combustion engine, comprising:
(a) at least one reciprocating piston for imparting rotational forces to a crankshaft;
(b) a combustion chamber associated with said piston;
(c) structure defining a fuel mixture flow path including an inlet and extending into fluid communication with each combustion chamber through a valve controlled port;
(d) fuel mixture introducing means disposed near said inlet for introducing air and a vaporizable fuel into said flow path;
(e) the structure including:
  (i) a fuel mixture vaporizer including a flow path portion and structure for transferring heat absorbed from an engine fluid to said fuel mixture;
  (ii) a fuel mixture homogenizer driven by means external to said fuel mixture flow path and disposed in said mixture flow path intermediate said fuel mixture vaporizer and said combustion chamber and being spaced from said vaporizer flow path portion, the homogenizer including structure for heating a mixture as it is homogenized; and,
  (iii) a fuel mixture heater disposed intermediate said fuel mixture homogenizer and said combustion chamber for transferring heat exhausted by said combustion chamber to said fuel mixture; and,
(f) said fuel heater comprising a chamber including means defining a passage as another portion of said flow path for flow from the homogenizer to said at least one combustion chamber.

15. The engine of claim 14 further including a thermal isolating means disposed in said flow path intermediate said fuel mixture introducing means and said fuel mixture homogenizer for inhibiting heat flow from said homogenizer to said fuel mixture introducing means.

16. The engine of claim 14 wherein a selected one of the homogenizer and the fuel mixture heater includes a constricting orifice.

17. The engine of claim 1 further including a thermal isolating means disposed in said flow path intermediate said fuel mixture introducing means and said fuel mixture homogenizer for inhibiting heat flow from said homogenizer to said fuel mixture introducing means.

18. The method of claim 2 wherein the fuel/air mixture is heated to a temperature at least twice the temperature of vaporization of the fuel.

19. For use with an electric ignition internal combustion engine having at least one reciprocatable piston and an associated combustion chamber, a fuel/air mixture preparation system including an inlet and defining a fuel mixture flow path for communication with such combustion chamber comprising:
(a) fuel mixture introducing means for disposition near said inlet for introducing predetermined portions of air and a vaporizable fuel into said flow path;
(b) the structure including:
  (i) a fuel mixture vaporizer including a flow path portion and structure for transferring heat absorbed from an engine fluid to said fuel mixture;
  (ii) a fuel mixture homogenizer to be driven by means external to said fuel mixture flow path and disposed in said mixture flow path intermediate said fuel mixture vaporizer and such combustion chamber and being spaced from said vaporizer flow path portion, the homogenizer including further structure for transferring heat from an engine fluid to said fuel mixture; and,
  (iii) a fuel mixture heater to be disposed intermediate said fuel mixture homogenizer and such combustion chamber for transferring heat exhausted by such combustion chamber to said fuel mixture;
(c) said fuel heater comprising a chamber including means defining a passage as another portion of said flow path for flow from the homogenizer to such combustion chamber.

20. The system of claim 19 further including a thermal isolating means disposed in said flow path intermediate said fuel mixture introducing means and said fuel mixture homogenizer for inhibiting heat flow from said homogenizer to said fuel mixture introducing means.

21. The system of claim 19 wherein a selected one of the homogenizer and the fuel mixture heater includes a constricting orifice.

22. The apparatus of claim 19 wherein said fuel vaporizing means comprises a chamber for disposition in said flow path including means for connection to a cooling system and when so connected transferring heat absorbed by such cooling system to said fuel mixture.

23. The apparatus of claim 19 wherein said fuel homogenizer comprises a first turbine to be driven by gases exhausted from said combustion chamber and an associated turbine chamber, said homogenizer including a second turbine to be in driven engagement with said first turbine, rotatable in the mixture flow path and operative to both homogenize and compress the fuel mixture.

24. The apparatus of claim 14 wherein the engine includes a cooling system and said fuel vaporizing means comprises a chamber disposed in said flow path including means for transferring heat absorbed by said cooling system to said fuel mixture.

25. The apparatus of claim 14 wherein said fuel homogenizer comprises a first turbine driven by gases exhausted from said combustion chamber and an associated turbine chamber, said homogenizer including a second turbine in driven engagement with said first turbine, rotatable in the mixture flow path and operative to both homogenize and compress the fuel mixture.

26. The apparatus of claim 14 wherein the internal combustion engine includes a pluraity of combustion chambers and said fuel mixture heating means subdivides the fuel mixture flow into a plurality of branch flow paths, each branch communicating with one of said combustion chambers.

27. The apparatus of claim 24 wherein said fuel vaporizing means is sized to exchange enough heat to said fuel mixture to maintain said fluid coolant below a predetermined operating temperature.

28. The apparatus of claim 14 wherein said fuel mixture introducing means comprises a carburetor.

29. The engine of claim 16 wherein the constricting orifice is between compressing components of the homogenizer and the passage.

* * * * *